US012651415B1

(12) United States Patent
Poot

(10) Patent No.: US 12,651,415 B1
(45) Date of Patent: Jun. 9, 2026

(54) AUGMENTED SPHERICAL IMAGE CONTENT BASED ON DETECTED ATTRIBUTES

(71) Applicant: Apple Inc., Cupertino, CA (US)

(72) Inventor: Rudy Poot, Mill Valley, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 18/215,228

(22) Filed: Jun. 28, 2023

Related U.S. Application Data

(60) Provisional application No. 63/357,476, filed on Jun. 30, 2022.

(51) Int. Cl.
G06T 19/00 (2011.01)
G02B 27/01 (2006.01)
G06T 5/50 (2006.01)

(52) U.S. Cl.
CPC ........ G06T 19/006 (2013.01); G02B 27/0172 (2013.01); G06T 5/50 (2013.01); G06T 2207/20221 (2013.01); G06T 2207/20228 (2013.01)

(58) Field of Classification Search
CPC .................... G06T 19/006; G06T 5/50; G06T 2207/20221; G06T 2207/20228; G02B 27/0172
See application file for complete search history.

(56) References Cited

U.S. PATENT DOCUMENTS

| | | | | |
|---|---|---|---|---|
| 9,645,395 | B2 | 5/2017 | Bolas et al. | |
| 10,255,715 | B2 | 4/2019 | Mallinson | |
| 2015/0054913 | A1* | 2/2015 | Annau | G06Q 30/0246 |
| | | | | 348/36 |
| 2016/0191815 | A1* | 6/2016 | Annau | G06Q 30/0263 |
| | | | | 348/38 |

(Continued)

OTHER PUBLICATIONS

Fernandes, Ajoy S.; Feiner, Steven K.; "Combating VR Sickness through Subtle Dynamic Field-of-View Modification"; 2016; pp. 201-210.

(Continued)

*Primary Examiner* — Sarah Lhymn
(74) *Attorney, Agent, or Firm* — Thompson Hine LLP

(57) ABSTRACT

Various implementations disclosed herein include devices, systems, and methods that provides augmented spherical image content based on detected attributes. For example, an example process may include obtaining a spherical image content (e.g., captured 180°/360°/surround video content) generated using a combination process that combines images that were captured within a particular time period by a multi-camera configuration, the multi-camera configuration includes a plurality of cameras oriented in different respective orientations, and the time period is below a threshold. The process may further include determining an attribute of the spherical image content corresponding to the multi-camera configuration or the combination process, generating virtual content based on the determined attribute, wherein at least a portion of the virtual content is configured (Continued)

to be congruent with the attribute of the spherical image content, and generating augmented spherical image content based on the spherical image content and the virtual content.

21 Claims, 8 Drawing Sheets

(56) References Cited

U.S. PATENT DOCUMENTS

| | | | | |
|---|---|---|---|---|
| 2018/0027219 | A1* | 1/2018 | Hattingh | H04N 9/3185 |
| | | | | 345/647 |
| 2018/0139431 | A1* | 5/2018 | Simek | H04N 13/271 |
| 2018/0189565 | A1* | 7/2018 | Lukierski | B25J 9/1697 |
| 2019/0026958 | A1* | 1/2019 | Gausebeck | G06T 7/579 |
| 2019/0220952 | A1* | 7/2019 | Lee | H04N 5/2628 |
| 2020/0342652 | A1* | 10/2020 | Rowell | G06V 10/82 |
| 2022/0343525 | A1* | 10/2022 | Garg | G06N 3/045 |
| 2023/0018560 | A1* | 1/2023 | Briggs | G06F 3/012 |
| 2023/0281954 | A1* | 9/2023 | Grau | G06T 11/00 |
| | | | | 382/104 |

OTHER PUBLICATIONS

Lim; Kyungmin; Lee, Jaesung; Won, Kwanghyun, Kala, Nupur and Lee, Tammy; "A novel method for VR sickness reduction based on dynamic field of view processing"; Virtual Realtiy (2021) 25: 331-340.
Langbehn, Eike, Raupp, Tino, Bruder, Gerd, Steinicke, Frank, Bolte, Benjamin; Lappe, Markus; "Visual Blur in Immersive Virtual Environments: Does Depth of Field or Motion Blur Affect Distance and Speed Estimation?"; Conference Paper, Sep. 2016; pp. 1-11.
Nvidia Turing GPU Architecture; Graphics Reinvented; WP-09183-001_v01; pp. 1-87.

* cited by examiner

800

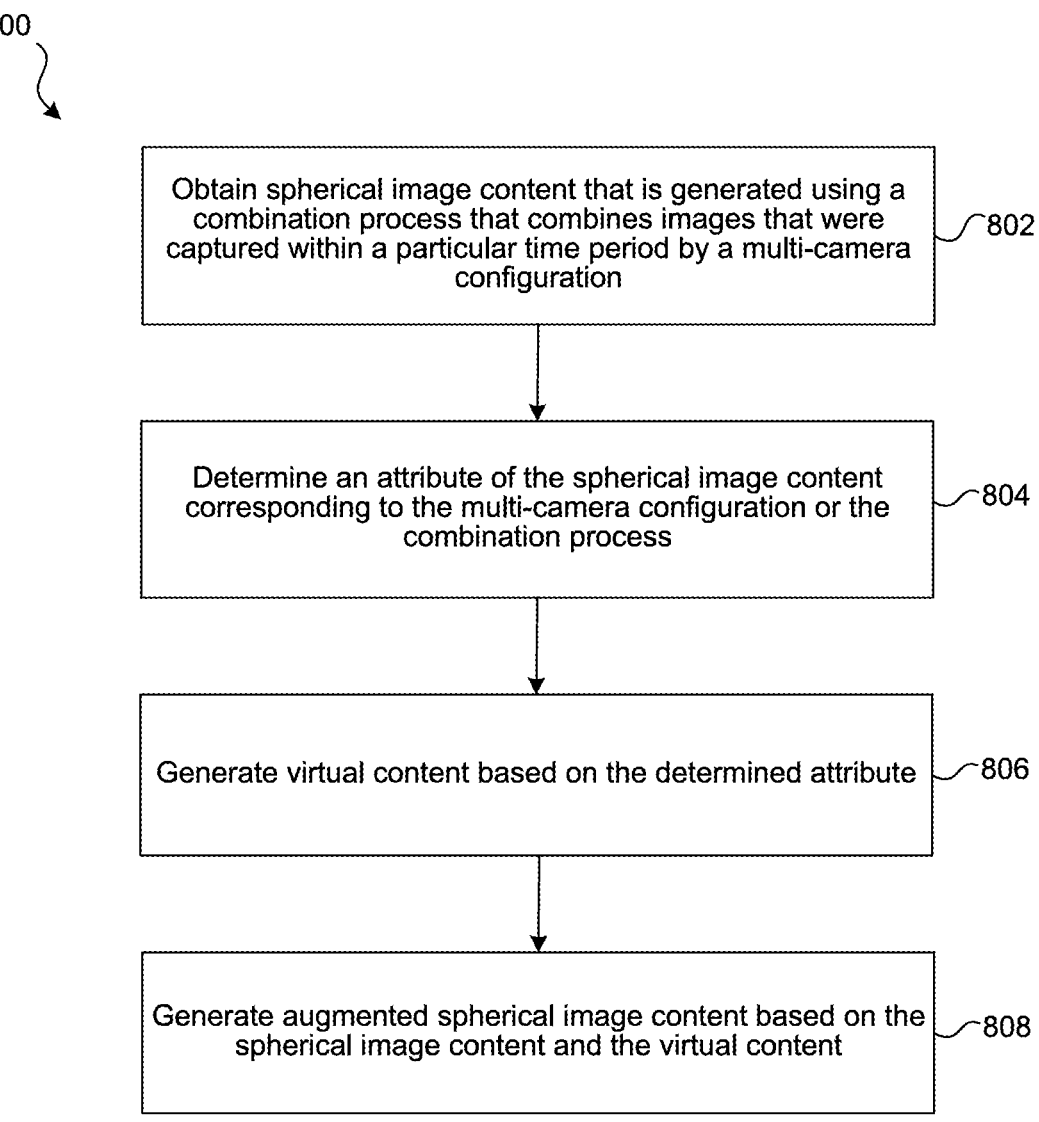

Obtain spherical image content that is generated using a combination process that combines images that were captured within a particular time period by a multi-camera configuration — 802

Determine an attribute of the spherical image content corresponding to the multi-camera configuration or the combination process — 804

Generate virtual content based on the determined attribute — 806

Generate augmented spherical image content based on the spherical image content and the virtual content — 808

FIG. 8

Device 900

Processing Unit(s) 902

Comm. Interface(s) 908

Display(s) 912

Memory 920

Operating System 930

Instruction Set(s) 940

Spherical Content Instruction Set 942

Attribute Tracking Instruction Set 944

Content Augmentation Instruction Set 946

904

I/O Device(s) & Sensor(s) 906

Programming Interface(s) 910

Image Sensor System(s) 914

AUGMENTED SPHERICAL IMAGE CONTENT BASED ON DETECTED ATTRIBUTES

CROSS-REFERENCE TO RELATED APPLICATIONS

This Application claims the benefit of U.S. Provisional Application Ser. No. 63/357,476 filed Jun. 30, 2022, which is incorporated herein in its entirety.

TECHNICAL FIELD

The present disclosure generally relates to techniques for providing content with electronic devices including systems, methods, and devices for augmenting spherical image content based on detected attributes.

BACKGROUND

Spherical videos are typically created by using multiple cameras/lenses (in different orientations) to simultaneously capture images that are stitched together to form each video frame. Spherical video content may include 180° content, 360° content, surround videos, and the like. Omni-directional stereo (ODS) is an example of a spherical video that utilizes a projection model for stereo 360-degree videos. ODS is designed for VR viewing with a head-mounted display (HMD) that uses a special projection format that allows panoramic and stereo display, is pre-rendered, and encoded as two video streams. Techniques for generating content (e.g., virtual content) for spherical videos (e.g., 180°/360°/surround videos, such as ODS) may lack accuracy in various circumstances because the added content fails to depict the same attributes (e.g., imperfections) as the captured spherical video content. For example, such techniques may lack accuracy for depicting the added content with sunlight refractions, lens aberrations, a Fresnel blur falloff of the lens, a sweet spot (e.g., sharpest pixels) of the lens, etc. that is displayed in the captured video.

SUMMARY

The frames of spherical videos (e.g., 180°/360°/surround videos) will generally have attributes (e.g., imperfections) that result from the multi-camera set-up and/or the image combination process. Augmented spherical videos are spherical videos that have virtual content added and may appear incongruous where the added virtual content fails to depict the same attributes (e.g., imperfections) as the captured spherical video content. It is desirable to enable a means for augmenting spherical image content based on detected attributes. Various implementations disclosed herein include devices, systems, and methods that enhance omnidirectional stereo (ODS) lens shader techniques with captured lens aberration details to provide more realistic results when creating and blending computer generated stereo foregrounds into camera captured stereo backgrounds. For example, some implementations provide a view of a three-dimensional (3D) environment that generates more congruous augmented spherical video content by using virtual content that mimics such attributes (imperfections), i.e., based on determining that the spherical image content has an attribute that results from the multi-camera configuration or combination process and mimicking that attribute in the virtual content. In particular, such techniques may improve accuracy when mimicking such attributes (e.g., imperfections) for depicting added content with sunlight refractions, lens aberrations, a Fresnel blur falloff of the lens, lens clarity, dispersion, a sweet spot (e.g., sharpest pixels) of the lens, etc. that is displayed in the captured video.

In general, one innovative aspect of the subject matter described in this specification can be embodied in methods, at an electronic device having a processor, that include the actions of obtaining spherical image content, wherein the spherical image content is generated using a combination process that combines images that were captured within a particular time period by a multi-camera configuration, the multi-camera configuration includes a plurality of cameras oriented in different respective orientations, and the time period is below a threshold, determining an attribute of the spherical image content corresponding to the multi-camera configuration or the combination process, generating virtual content based on the determined attribute, wherein at least a portion of the virtual content is configured to be congruent with the attribute of the spherical image content, and generating augmented spherical image content based on the spherical image content and the virtual content.

These and other embodiments can each optionally include one or more of the following features.

In some aspects, the attribute of the spherical image content is determined by determining a hardware-specific characteristic of at least one of the plurality of cameras. In some aspects, the hardware-specific characteristic of at least one of the plurality of cameras includes a camera position of the at least one of the plurality of cameras. In some aspects, the hardware-specific characteristic of at least one of the plurality of cameras includes an orientation of the at least one of the plurality of cameras. In some aspects, the hardware-specific characteristic of at least one of the plurality of cameras includes a lens type of the at least one of the plurality of cameras.

In some aspects, the attribute of the spherical image content is determined by detecting a disparity in the spherical image content corresponding to the combination process. In some aspects, the attribute of the spherical image content is determined by detecting an imperfection characteristic in the spherical image content.

In some aspects, a three-dimensional (3D) view of the augmented spherical image content includes a virtual object that appears to be at a 3D location within a physical environment depicted by the spherical image content. In some aspects, the 3D view includes an image, video, or 3D reconstruction of a physical environment obtained via one or more sensors on the device during a recording. In some aspects, the 3D view is presented an extended reality (XR) environment.

In some aspects, the augmented spherical image content includes a video. In some aspects, the augmented spherical image content includes stereo images.

In some aspects, the device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 is a flowchart representation of an exemplary method for visually representing a 3D environment including the projection of a 3D image within the 3D environment in accordance with some implementations.

Figures 1, 2:
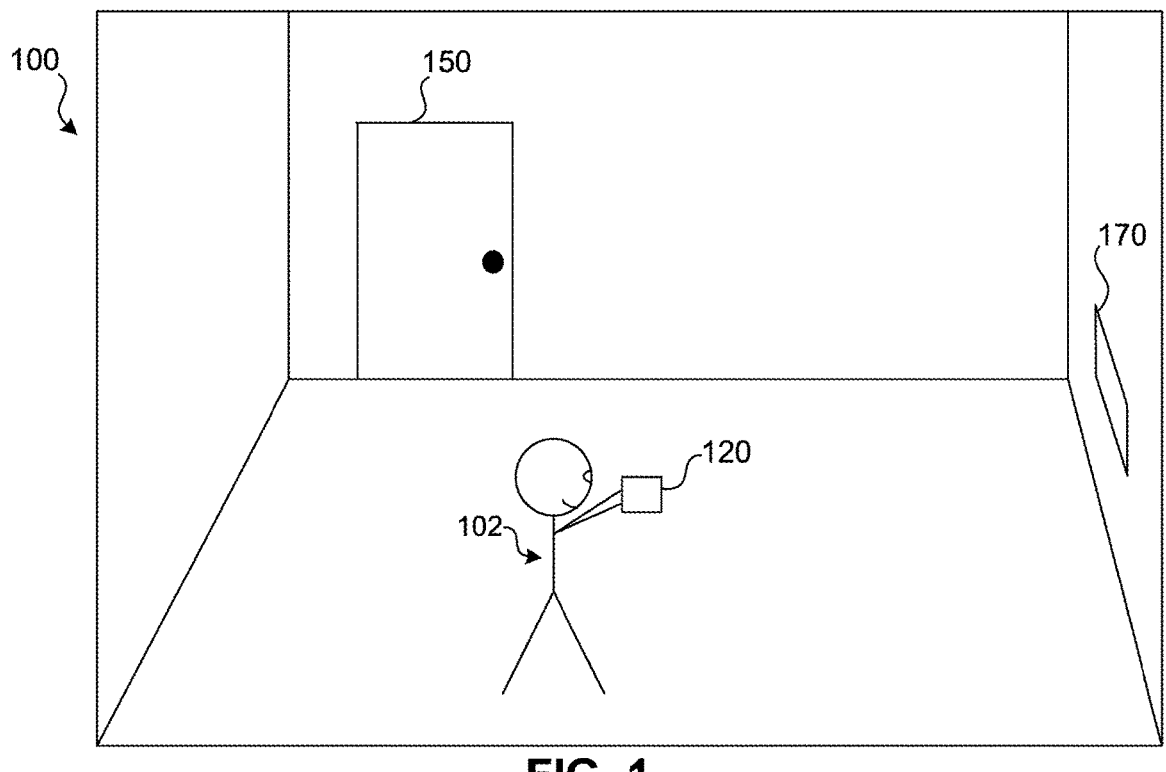
FIG. 1 illustrates an exemplary electronic device operating in a physical environment in accordance with some implementations.
FIG. 2 illustrates an exemplary three-dimensional (3D) environment generated based on the physical environment of FIG. 1 and a projection of spherical image content within the 3D environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100 in accordance with some implementations. The physical environment 100 includes a door 150 and a wall hanging 170. Additionally, physical environment 100 includes user 102 holding electronic device 120. The electronic device 120 includes one or more cameras or other sensors that can be used to capture or generate representations of the door 150, the wall hanging 170, and other objects of the physical environment 100. In some implementations, the device 120 is configured to present a computer-generated environment to the user 102. The presented environment can include extended reality (XR) features.

In some implementations, the device 120 is a handheld electronic device (e.g., a smartphone or a tablet). In some implementations, the device 120 is a near-eye device such as a head worn device. The device 120 utilizes one or more display elements to present views. For example, the device 120 can display views that include content in the context of an extended reality (XR) environment. In some implementations, the device 120 may enclose the angle-of-view of the user 102. In some implementations, the functionalities of device 120 are provided by more than one device. In some implementations, the device 120 communicates with a separate controller or server to manage and coordinate an experience for the user. Such a controller or server may be located in or may be remote relative to the physical environment 100.

FIG. 2 illustrates an exemplary three-dimensional (3D) environment 200 generated based on the physical environment 100 of FIG. 1 and a projection of spherical image content within the 3D environment 200. The projection of a 3D image may also be referred to herein as a "portal". The 3D environment 200 includes representations 250 and 270 of the door 150 and wall hanging 170, respectively, of the physical environment 100. The 3D environment 200 also includes visual content 285 that is displayed to form a virtual shape 280 (e.g., a sphere that provides a view of spherical image content such as 180°, 360°, surround videos, etc.). The visual content 285 being displayed to form the virtual shape 280 constitutes the portal (e.g., a projection of an image), as discussed herein.

The electronic device 120 provides views of the 3D environment 200 that include depictions of the 3D environment from a viewer position 220 with a viewing angle 206, which in this example is determined based on the position of the electronic device 120 in the physical environment 100. Thus, as the user moves the electronic device 120 relative to the physical environment 100, the viewer position 220 corresponding the electronic device 120 position is moved relative to the 3D environment 200. The view of the 3D environment provided by the electronic device changes based on changes to the viewer position 220 relative to the 3D environment 200. In some implementations, the 3D environment 200 does not include representations of the physical environment 100, for example, including only virtual content corresponding to a virtual reality environment.

The portal view (e.g., a virtual image/video viewer application window) in the example view 400 provides a "snow globe" effect for the photo/video that is projected within. The visual content 285 may include a 3D image that may be one or more images, a video, an animation, or other visible content that is recorded or created. The visual content 285 may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-linear surface without adjustment. For example, the visual content 285 may be displayed on a portion of an inside or outside of an approximately spherical shape (which may be invisible). Non-linear visual content may be captured and displayed without distortion or adjustment that would otherwise be used to present the content on a planar surface. In some implementations, the visual content 285 may include a 180° stereo image pair or 180° stereo video content stored as equirectangular projections. In some implementations, spatialized depth data may also be obtained and used to enable a spatialized view.

In the example of FIGS. 1 and 2, the electronic device 120 is illustrated as a single, hand-held device. The electronic device 120 may be a mobile phone, a tablet, a laptop, so forth. In some implementations, electronic device 120 is worn by a user. For example, electronic device 120 may be a watch, a head-mounted device (HMD), head-worn device (glasses), headphones, an ear mounted device, and so forth. In some implementations, functions of the device 120 are accomplished via two or more devices, for example a mobile device and base station or a head mounted display and an ear mounted device. Various capabilities may be distributed amongst multiple devices, including, but not limited to, power capabilities, CPU capabilities, GPU capabilities, storage capabilities, memory capabilities, visual content display capabilities, audio content production capabilities, and the like. The multiple devices that may be used to accomplish the functions of electronic device 120 may communicate with one another via wired or wireless communications.

A physical environment (e.g., physical environment 100) refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 3:
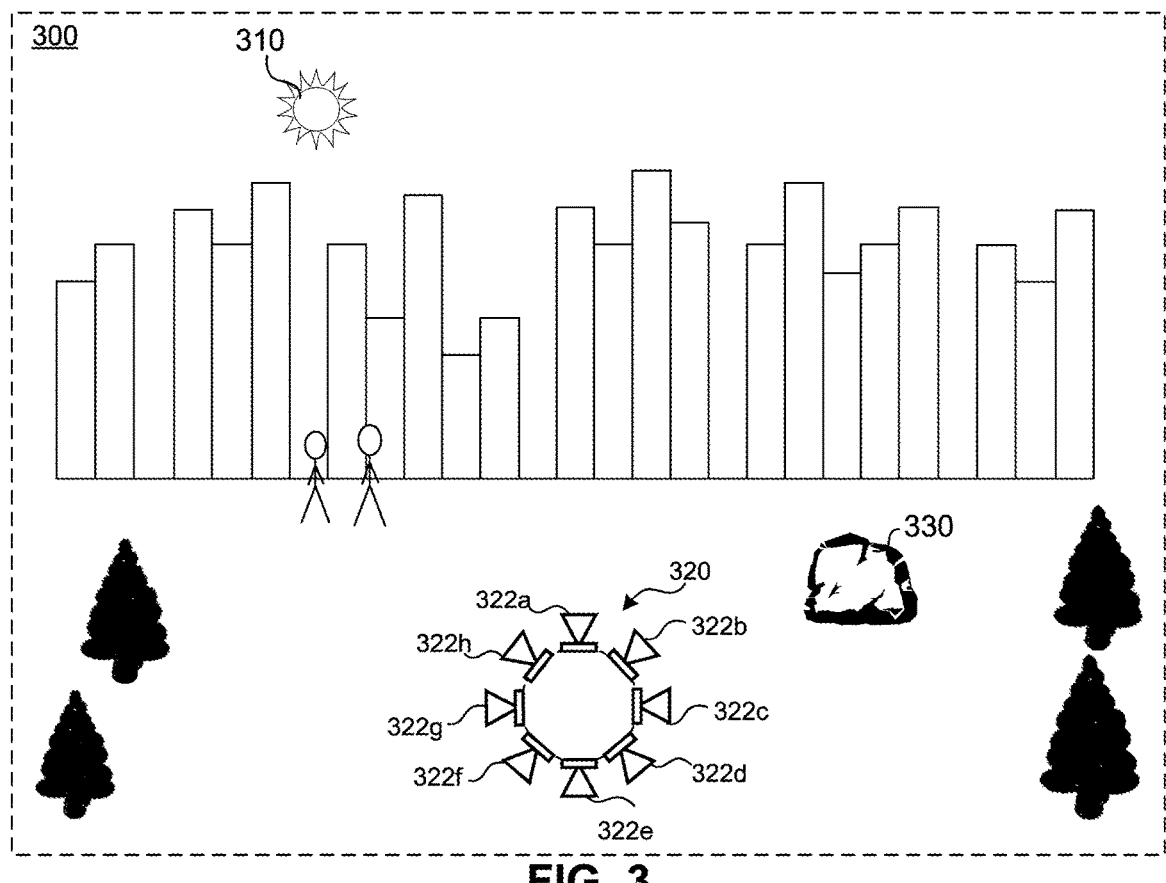
FIG. 3 illustrates an exemplary electronic device that includes a multi-camera set-up to simultaneously capture images operating in a physical environment in accordance with some implementations.

FIG. 3 illustrates an exemplary electronic device 320 that includes a multi-camera set-up to simultaneously capture images operating in a physical environment 300 in accordance with some implementations. In particular, FIG. 3 illustrates the use of a multi-camera device (e.g., device 320) in the physical environment 300 (e.g., in a city park with a group of buildings and two people in the background). The physical environment including a view of the sun 310 and rock 330. The device 320 includes a plurality of cameras 322a-322h (also referred to collectively as cameras 322) that simultaneously captures a plurality of images that can be stitched together as one spherical image(s) or video content (e.g., 180°, 360°, surround video, etc.).

Figure 4:
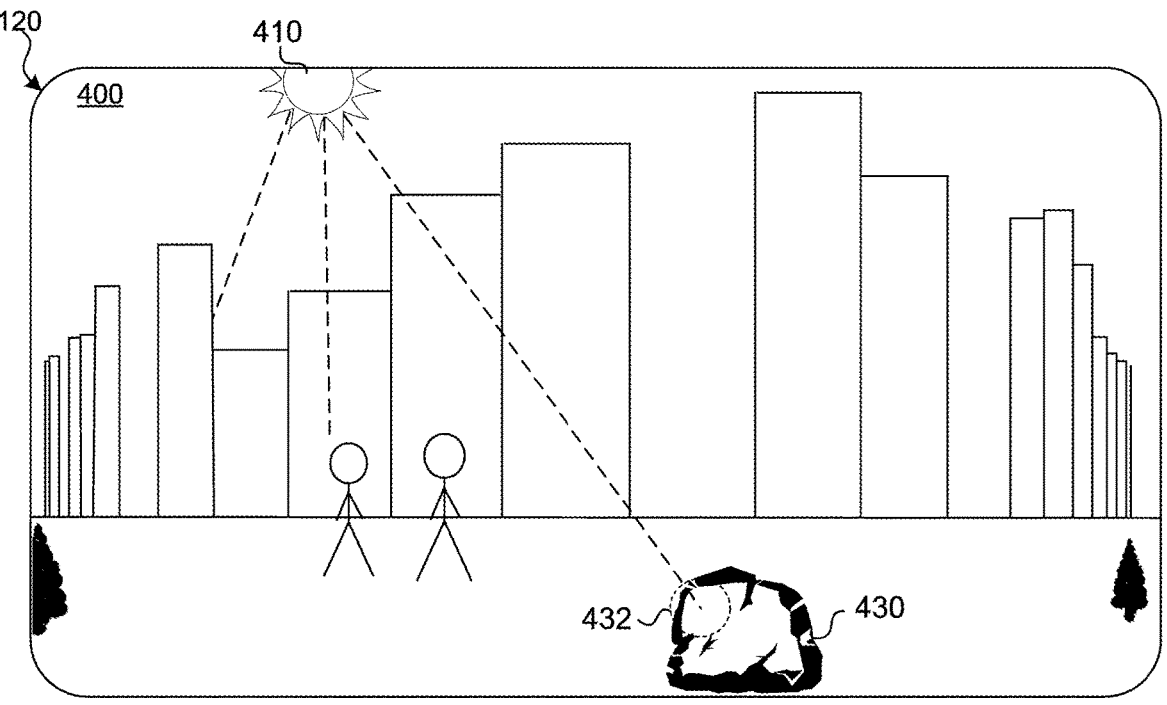
FIG. 4 illustrates an example view of the spherical image content provided by the device of FIG. 3 in accordance with some implementations.

FIG. 4 illustrates an example view 400 of the physical environment 300 of FIG. 3 provided by the device 120 of FIG. 1 of spherical image data captured by the multi-camera device 320, in accordance with some implementations. For example, the view 400 is illustrated as visual content 285 that is displayed on a surface of a virtual shape 280 on a display of an electronic device (e.g., electronic device 120). For example, the example view 400 represents an example viewpoint of the user 102 (e.g., at viewer position 220 of FIG. 2) that he or she would be viewing in FIG. 2 of an image (e.g., visual content 285, i.e., an image of two people with a background of a city) provided within a portal (e.g., virtual shape 280). The view 400 includes a representation 410 of the sun 310, a representation 430 of the rock 330. Additionally, the rays of the sun 410 produces a reflection 432 on the rock 330 as captured by the device 320.

Figure 5:
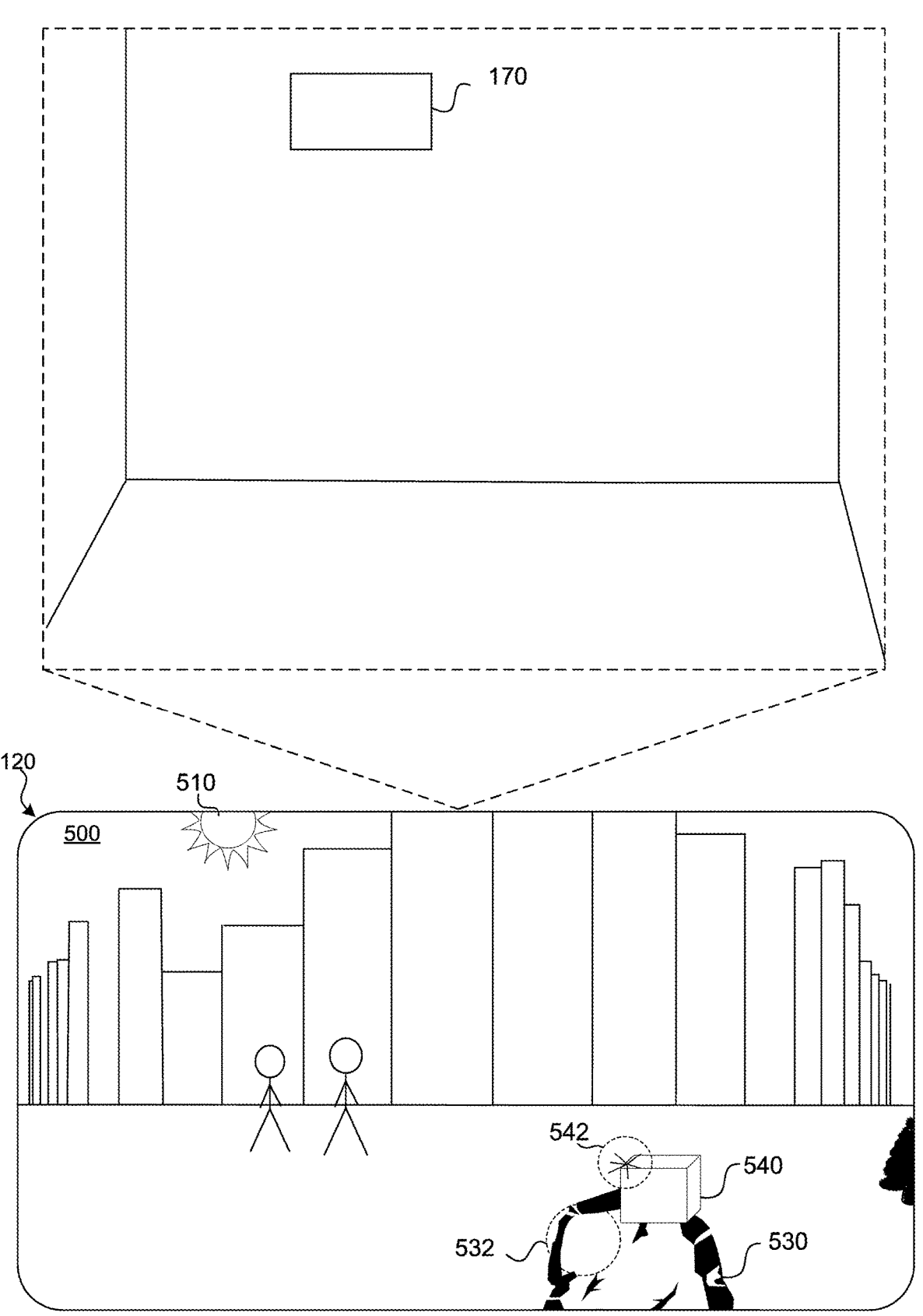
FIG. 5 illustrates an example view of the augmented spherical image content of the image of FIG. 4 provided by the device of FIG. 2 in accordance with some implementations.

FIG. 5 illustrates an example view 500 of the physical environment 300 of FIG. 3 provided by the device 120 of FIG. 1 of spherical image data captured by the multi-camera device 320 with additional virtual content to augment the spherical image data, in accordance with some implementations. For example, the example view 500 represents an example viewpoint of the user 102 (e.g., at viewer position 220 of FIG. 2) that he or she would be viewing in FIG. 2 of an image (e.g., visual content 285, i.e., an image of two people with a background of a city) provided within a portal (e.g., virtual shape 280). Similar to view 400 of FIG. 4, the view 500 includes a representation 120? of the sun 410, a representation 430 of the rock 330, and a reflection 432 on the rock 330 as captured by the device 320. However, view 500 also includes a virtual object 540 and a virtual reflection 542 that is generated based on the detected reflection 432 on rock 330 (e.g., same angle of incidence as if the sun 310 was producing a glare on the virtual object 540). In particular, the view 500 of FIG. 5 illustrates generating augmented spherical image content based on the obtained spherical image content (e.g., view 400 of FIG. 4) and generating virtual content (e.g., virtual object 540). For example, a virtual object may be added to appear to be at a 3D location within the physical environment depicted by the spherical image content. For example, as illustrated in FIG. 5, the reflection 532 of the sun 510 on the rock 530 is replicated as reflection 542 on the virtual object 540. The augmented spherical image content may be video (e.g., have multiple frames) and may be stereo (e.g., having different frame content corresponding to each eye).

In some implementations, generating virtual content may include synthesizing content for missing content portions. Although sunlight reflections are shown in FIG. 5, the detected attributes from the multi-camera device(s) may include other attributes or imperfections that may be mimicked for the augmented spherical image content. For example, multi-camera configurations may produce seams or other missing content when the images are stitched together to form the spherical images. Other attributes or imperfections may include lens aberrations, other lighting refractions in appropriate locations, a Fresnel blur falloff of the lens, lens clarity, dispersion, a sweet spot (e.g., sharpest pixels) of the lens, etc. that is displayed in the captured content. Thus, the generated (virtual) content for each view may also replicate any detected camera or scene attributes and/or imperfections.

Figure 6:
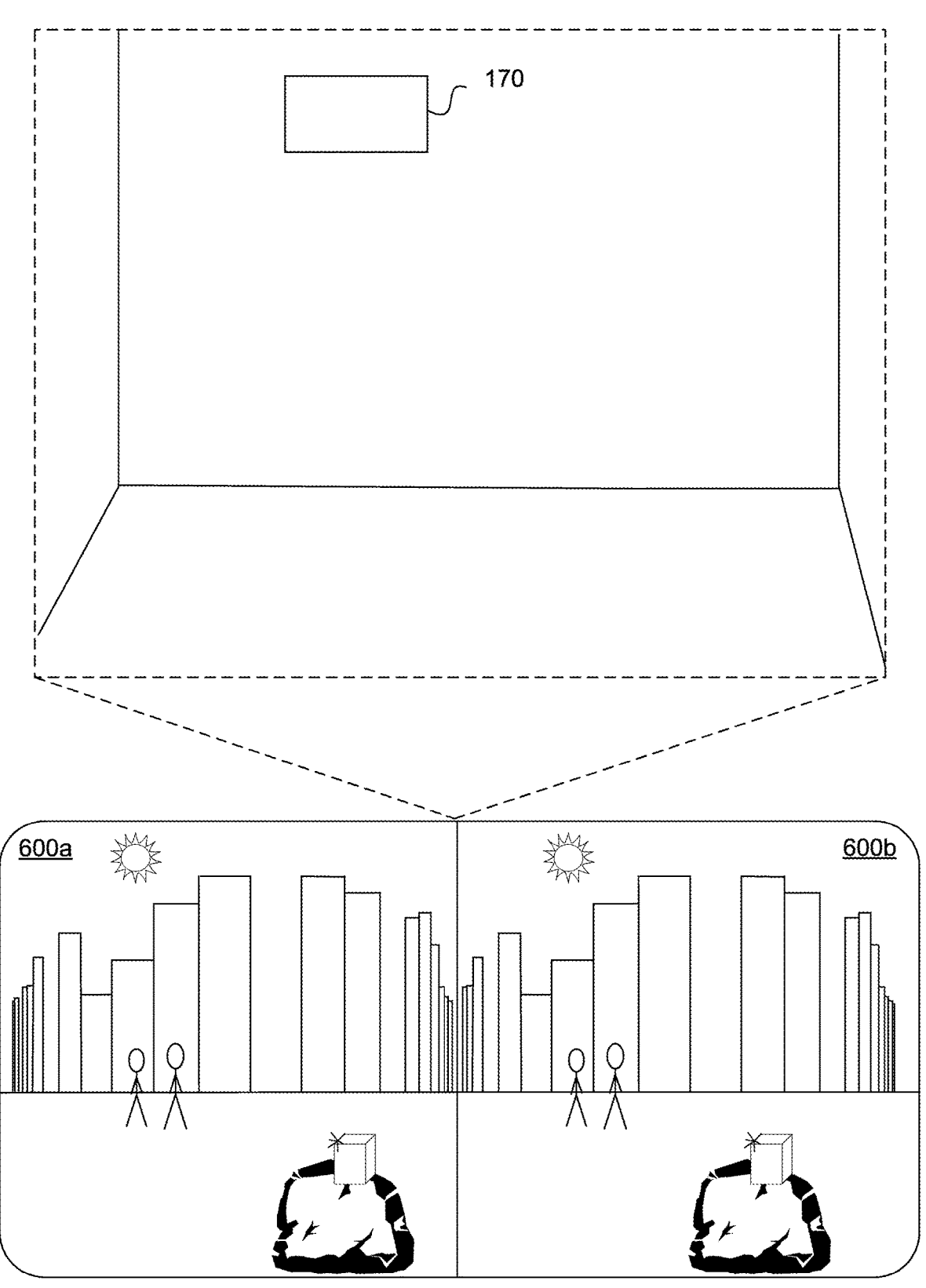
FIG. 6 illustrates example views of the image of FIG. 5 provided by the device of FIG. 2, the views including a left eye view and a right eye view in accordance with some implementations.

FIG. 6 illustrates example views 600*a* and 600*b* of the view 500 of FIG. 5, where the views 600*a* and 600*b* include a left eye view and a right eye view, respectively, in accordance with some implementations. For example, the example view 500*a* represents an example left-eye viewpoint of the user 120 that he or she would be viewing in FIG. 1 of augmented spherical image content (e.g., the photo of two people with a background of a city with a virtual reflection 532 on a virtual object 540) within a portal (e.g., virtual shape 280). The second view 600*b* represents an example right-eye viewpoint of the user 120 and is at a different location (compared to the first view 600*a*) based on the different viewpoint (e.g., pupillary distance with respect to the convergence of the user's gaze upon an object of interest). Thus, if viewed on an HMD, the combination of example views 600*a* and 600*b* would present a stereo image to a user.

In some implementations, the left eye view 600*a* and the right eye view 600*b* may create a seamless blended view to the viewer. The blended view may be based on matching a sharpest center pixel (e.g., sweet spot) for each eye where the foreground computer generated content (e.g., virtual object 540) meets with the background content (e.g., rock 530). In some implementations, generating a seamless blended stereo view may be based on an accumulated blur for each eye.

Figure 7A:
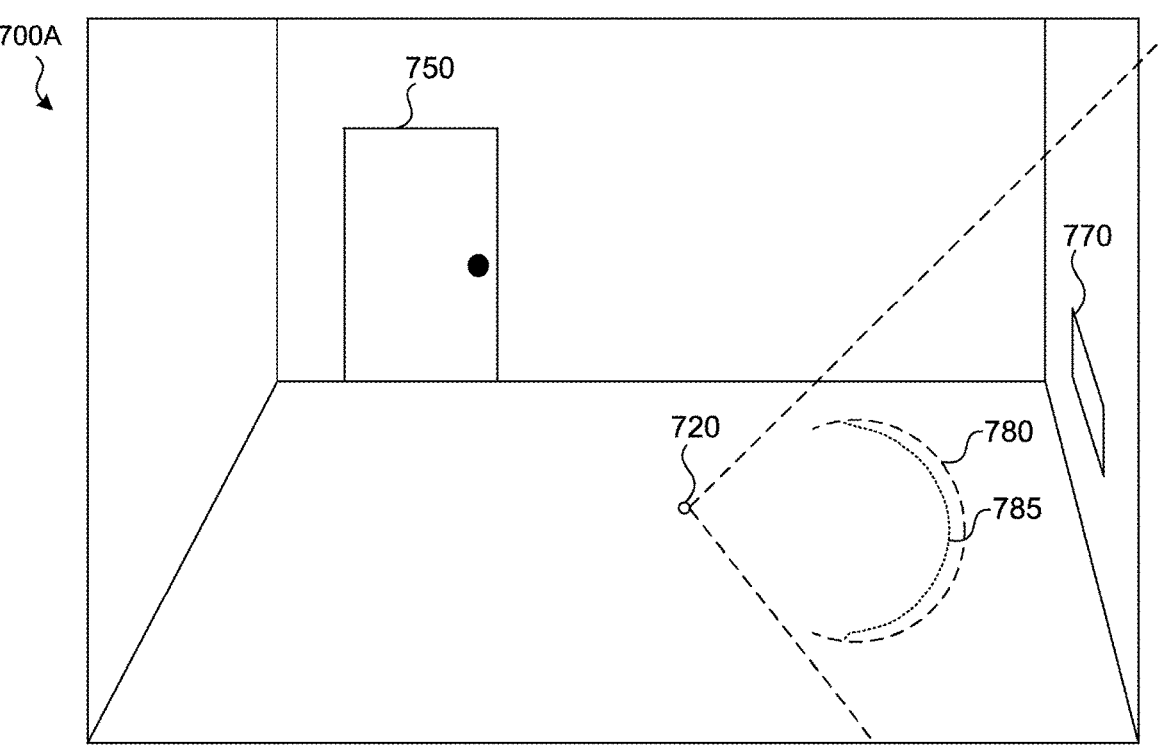
FIG. 7A illustrates an exemplary 3D environment generated based on the physical environment of FIG. 1 and a projection of a 3D image within the 3D environment in accordance with some implementations.

FIG. 7A illustrates an exemplary 3D environment 700A generated based on the physical environment 100 of FIG. 1 and a projection of a 3D image (e.g., spherical image content) within the 3D environment 700A. The 3D environment 700A includes representations 750 and 770 of the door 150 and wall hanging 170, respectively, of the physical environment 100. The 3D environment 700A also includes visual content 785 that is displayed to form a virtual shape 780 (e.g., a 3D virtual shape such as a half-sphere, aka a "snow globe" view). The visual content 785 being displayed to form the virtual shape 780 constitutes the portal (e.g., a projection of an image), as discussed herein. Additionally, in comparison to the 3D environment 200 of FIG. 2, the 3D environment 700A shows viewer position 720 to be further away to the virtual shape 780 than viewer position 220 to the virtual shape 280 so that the user 102 at viewer position 720 can see a portion of the physical environment 100 outside of the portal (e.g., virtual shape 780).

Figure 7B:
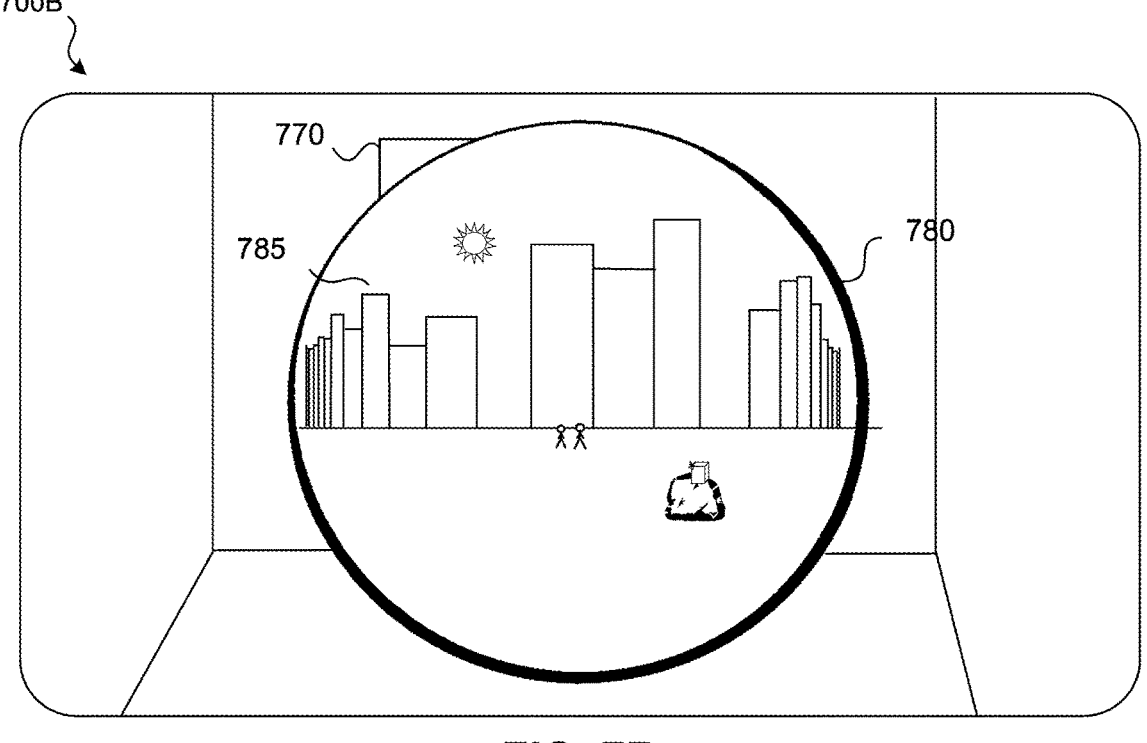
FIG. 7B illustrates an example view of the image of FIG. 7A in accordance with some implementations.

FIG. 7B illustrates an example view 700B at a display of a device (e.g., device 120) of the augmented spherical image content of FIG. 5 provided by the multi-camera device 320 of FIG. 3, in accordance with some implementations. For example, the physical environment 300 is illustrated as visual content 785 that is displayed on a surface of a virtual shape 780 (e.g., a 3D virtual shape such as a half-sphere, aka a "snow globe" view) on a display of an electronic device (e.g., electronic device 120). For example, the example view 700B represents an example viewpoint of the user 120 that he or she would be viewing in FIG. 7A of an image (e.g., visual content 785, i.e., an image of two people with a background of a city with a virtual reflection 532 on a virtual object 540 from the sun) provided within a portal (e.g., virtual shape 780). In particular, based on the current view from viewpoint 720, only 180° of the content 785 is displayed.

FIG. 8 is a flowchart illustrating an exemplary method 800. In some implementations, a device such as electronic device 120 (FIG. 1) performs the techniques of method 800 to augment spherical image content based on obtaining the spherical image content from a multi-camera configuration and generating virtual content based on a detected attribute from the spherical image content. In some implementations, the techniques of method 800 are performed on a mobile device, desktop, laptop, HMD, ear-mounted device or server device. In some implementations, the method 800 is performed by processing logic, including hardware, firmware, software, or a combination thereof. In some implementations, the method 800 is performed on a processor executing code stored in a non-transitory computer-readable medium (e.g., a memory).

At block 802, the method 800 obtains spherical image content that is generated using a combination process that combines images that were captured within a particular time period by a multi-camera configuration, the multi-camera configuration includes a plurality of cameras oriented in different respective orientations, and the time period is below a threshold; The particular time period may refer to capturing the images approximately simultaneously (e.g., within one second of each other). The spherical image content may include stereo images, e.g., including a spherical image for each eye for each frame, such as omnidirectional stereo (ODS) content.

The spherical image content may be one or more images, a video, an animation, or other visible content that is recorded or created, including, but not limited to, 180°, 360°, and/or surround video content, or the like. The spherical image content may be non-linear content captured from a camera such as a camera with a fisheye lens. Such a camera may capture non-linear content corresponding to the shape of the lens without flattening the content and this non-linear content may be positioned in a 3D environment, e.g., on a corresponding non-linear surface without adjustment. For example, the content may be displayed on a portion of an inside or outside of an approximately spherical shape (which may be invisible). Non-linear visual content may be captured and displayed without distortion or adjustment that would otherwise be used to present the content on a planar surface.

In some implementations, the spherical image content includes a stereoscopic image pair including left eye content corresponding to a left eye viewpoint and right eye content corresponding to a right eye viewpoint. In some implementations, the spherical image content may include a stereo image pair or stereo video content (e.g., 180° stereo image content) stored as equirectangular projections. For example, as illustrated in FIG. 6, a stereo image pair of 3D images is displayed to the user (e.g., view 600a is a left-eye view and view 600b is a right-eye view). In some implementations, spatialized depth data may also be obtained and used to enable a spatialized view. In some implementations, the 3D image includes a stereo photograph, a stereogram, flickering stereo images, a random dot stereogram, an anaglyph, a lenticular image, or the like. In some implementations, the 3D image may be any stereo image pair, e.g., such that differences between a right eye view and a left eye view enable the viewer to perceive depth within the image content that is depicted at the portal. For example, the spherical image content may be any type of stereo image pair such as 180° half sphere, rectilinear 90°, equirectangular projections, and the like, such that any image content with a known projection will work, as long as the content includes a stereo pair.

At block 804, the method 800 determines an attribute of the spherical image content corresponding to the multi-camera configuration or the combination process. For example, the attribute may be determined by determining a hardware-specific characteristic such as a specific camera position, orientation, lens type, etc. The attribute may be determined by detecting a stitching artifacts or other disparities. The attribute may be determined by detecting an imperfection in the image content (e.g., sunlight refraction, lens aberrations, etc.).

In some implementations, the attribute of the spherical image content is determined by determining a hardware-specific characteristic of at least one of the plurality of cameras. For example, hardware-specific characteristic of at least one of the plurality of cameras may include a specific camera position, an orientation of one or more of the cameras, a lens type, etc. In some implementations, the hardware-specific characteristic of at least one of the plurality of cameras is a camera position of the at least one of the plurality of cameras (e.g., determining the location of the camera with respect to one or more objects in the scene, such as the sun and sunlight reflections thereof). In some implementations, the hardware-specific characteristic of at least one of the plurality of cameras is an orientation of the at least one of the plurality of cameras (e.g., determining the orientation of the camera with respect to one or more objects in the scene, such as the sun and sunlight reflections thereof).

In some implementations, the hardware-specific characteristic of at least one of the plurality of cameras is a lens type of the at least one of the plurality of cameras (e.g., wide angle, standard, short telephoto, medium telephoto, fisheye, macro, etc.).

In some implementations, the attribute of the spherical image content is determined by detecting a disparity in the spherical image content corresponding to the combination process. For example, the detected attribute may include stitching artifacts or seams that can occur when two or more images are stitched together to complete the spherical image content (e.g., synthesizing image content).

In some implementations, the attribute of the spherical image content is determined by detecting an imperfection characteristic in the spherical image content. For example, the detected attribute may include sunlight refraction, lens aberrations, and like. For example, as illustrated in FIG. 4, the sun 410 produced a reflection 432 on the rock 430 that is shown in the view 405 obtained from the multi-camera system 320 of FIG. 3.

At block 806, the method 800 is generating virtual content based on the determined attribute, wherein at least a portion of the virtual content is configured to be congruent with the attribute of the spherical image content. For example, the virtual content may be generated to mimic the attribute of the spherical image content, e.g., showing the same imperfections, stitching artifacts in appropriate locations, sunlight refractions in appropriate locations, and the like. For example, as illustrated in FIG. 5, the reflection 532 of the sun 510 on the rock 530 is replicated as reflection 542 on the virtual object 540.

At block 808, the method 800 is generating augmented spherical image content based on the spherical image content and the virtual content. For example, a virtual object may be added to appear to be at a 3D location within the physical environment depicted by the spherical image content. For example, as illustrated in FIG. 5, the reflection 532 of the sun 510 on the rock 530 is replicated as reflection 542 on the virtual object 540. The augmented spherical image content may be video (e.g., have multiple frames) and may be stereo (e.g., having different frame content corresponding to each eye).

In some implementations, the method 800 further includes providing a 3D view of a 3D environment including the projection of the augmented spherical image and includes a virtual object (e.g., virtual object 540) that appears to be at a 3D location within a physical environment depicted by the spherical image content. The 3D view may be an image, video, or 3D reconstruction of a physical environment obtained via one or more sensors on the device during a recording. The 3D environment may be any type of environment including XR environments that include representations of real or virtual objects. For example, as illustrated in view 500 of FIG. 5, a view of an electronic device 120 provides a view of the 3D environment (e.g., a viewpoint towards the representation 270 of the wall hanging 170 of example environment 100) which includes the projection of an image (e.g., obtained spherical image content) and the augmented image (e.g., virtual object 540 that includes the detected attribute 542, a reflection of the sun 510).

In some implementations, the method 800 further includes adjusting the projection of the spherical image to reduce pixel disparity between the left and right eye viewpoints. For example, a convergence angle between the left eye viewpoint and the right eye viewpoint may be determined based on a user's gaze. The convergence angles may be determined based on a three-point triangle of a user's position, a projected 3D point of a pixel on an object for a left eye, and a projected 3D point of a pixel on an object for a right eye. As the two projected 3D points for the left and right eye view moves, the angle may become smaller or larger. The object may include the 3D image projection (e.g., a half-sphere), or the object may include a particular object within the projection of the 3D image that the user is focused on (e.g., a person).

Figure 9:
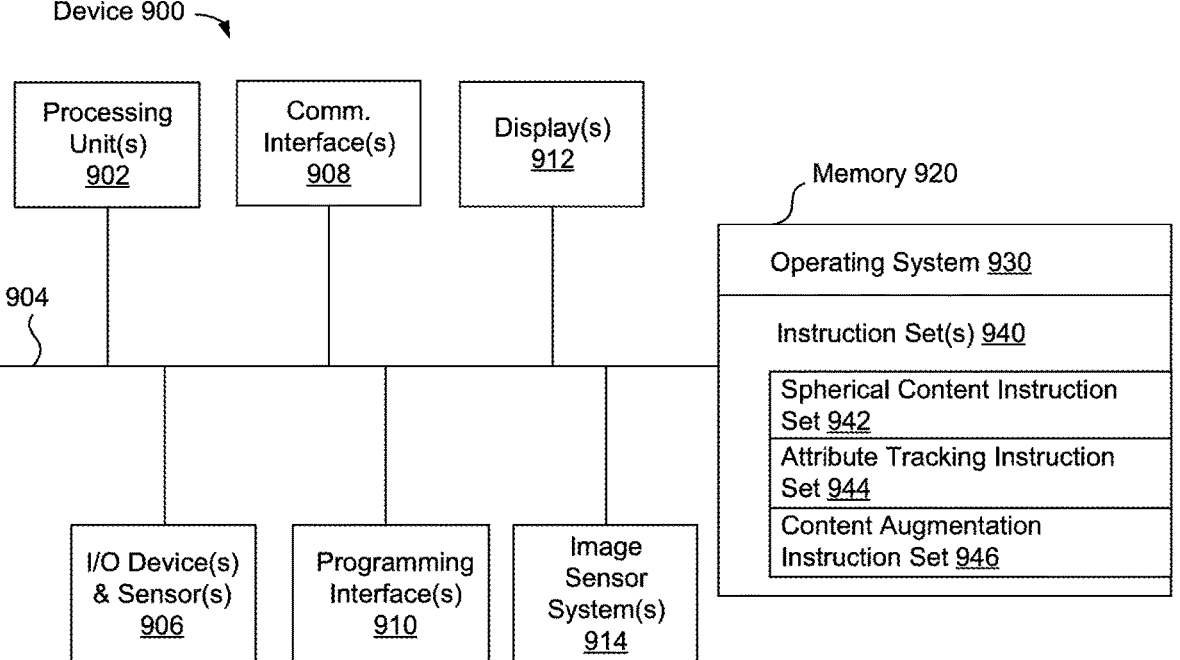
FIG. 9 is an example device in accordance with some implementations.

FIG. 9 is a block diagram of an example device 900. Device 900 illustrates an exemplary device configuration for device 120 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 900 includes a single display. In another example, the device 900 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

In some implementations, the device 120 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 120 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 120.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 includes a spherical content instruction set 942, attribute tracking instruction set 944, and a content augmentation instruction set 946. The instruction set(s) 940 may be embodied as a single software executable or multiple software executables.

The spherical content instruction set 942 is executable by the processing unit(s) 902 to provide visual content such as one or more images, video, animation, and the like. In some implementations, the spherical content instruction set 942 is executed to generate a 3D environment, include visual content in the 3D environment, and provide views of the 3D environment including the visual content based on a viewer position. The viewer position may be determined according to a position tracking instruction set and may be based on a viewer (e.g., user or device) position and movement in a physical environment. In some implementations, the spherical content instruction set 942 is executed to include visual content on a real or virtual surface in a 3D environment and provide views of the 3D environment including the visual content on the surface based on a viewer position and/or a viewer's gaze direction. The real or virtual surface may correspond to a shape, e.g., a flat plane, a portion of a sphere, a shape that corresponds to image content from which the visual content is created, etc.

The attribute tracking instruction set 944 is executable by the processing unit(s) 902 to determine a hardware-specific characteristic of the obtained spherical image content. This may involve determining a specific camera position, orientation, lens type, etc. for the multi-camera configuration that obtained the spherical image content (e.g., 180°/360°/surround videos).

In some implementations, the content augmentation instruction set 946 is executable by the processing unit(s) 902 to generate virtual content and augment the obtained spherical image content with the virtual content using one or more of the techniques discussed herein or as otherwise may be appropriate. To these ends, in various implementations, the instruction includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 10:
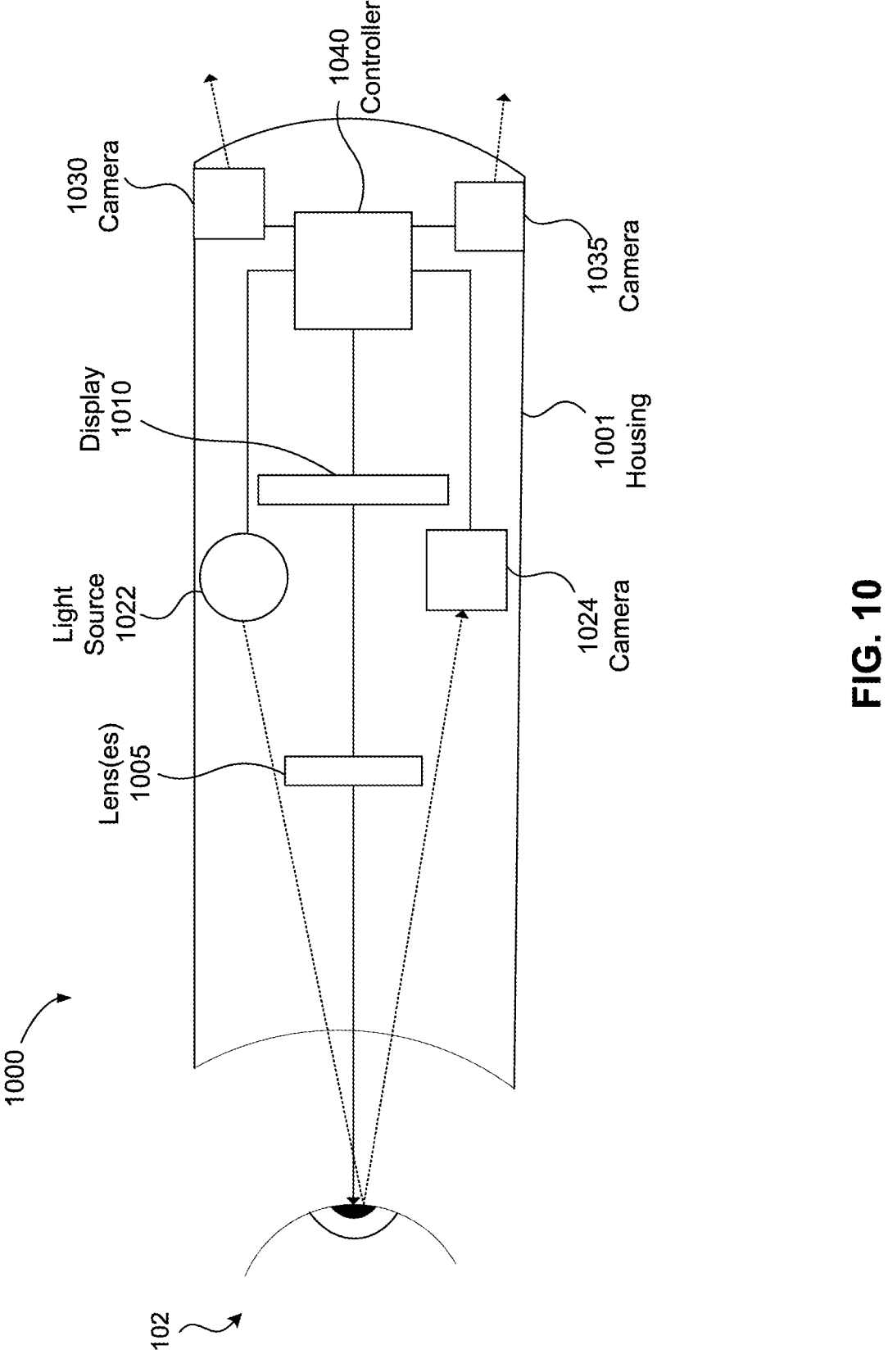
FIG. 10 illustrates an example head-mounted device (HMD) in accordance with some implementations.

FIG. 10 illustrates a block diagram of an exemplary head-mounted device 1000 in accordance with some implementations. The head-mounted device 1000 includes a housing 1001 (or enclosure) that houses various components of the head-mounted device 1000. The housing 1001 includes (or is coupled to) an eye pad (not shown) disposed at a proximal (to the eye(s) of the user 102) end of the housing 1001. In various implementations, the eye pad is a plastic or rubber piece that comfortably and snugly keeps the head-mounted device 1000 in the proper position on the face of the user 102 (e.g., surrounding the eye of the user 102).

The housing 1001 houses a display 1010 that displays an image, emitting light towards or onto the eye of a user 102. In various implementations, the display 1010 emits the light through an eyepiece having one or more lenses 1005 that refracts the light emitted by the display 1010, making the display appear to the user 102 to be at a virtual distance farther than the actual distance from the eye to the display 1010. For the user 102 to be able to focus on the display 1010, in various implementations, the virtual distance is at least greater than a minimum focal distance of the eye (e.g., 7 cm). Further, in order to provide a better user experience, in various implementations, the virtual distance is greater than 1 meter.

The housing 1001 also houses a tracking system including one or more light sources 1022, camera 1024, and a controller 1040. The one or more light sources 1022 emit light onto the eye of the user 102 that reflects as a light pattern (e.g., a circle of glints) that can be detected by the camera 1024. Based on the light pattern, the controller 1040 can determine an eye tracking characteristic of the user 102. For example, the controller 1040 can determine a gaze direction and/or a blinking state (eyes open or eyes closed) of the user 102. As another example, the controller 1040 can determine a pupil center, a pupil size, or a point of regard. Thus, in various implementations, the light is emitted by the one or more light sources 1022, reflects off the eye of the user 102, and is detected by the camera 1024. In various implementations, the light from the eye of the user 102 is reflected off a hot mirror or passed through an eyepiece before reaching the camera 1024.

The display 1010 emits light in a first wavelength range and the one or more light sources 1022 emit light in a second wavelength range. Similarly, the camera 1024 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 1010 by looking at it), provide foveated rendering (e.g., present a higher resolution in an area of the display 1010 the user 102 is looking at and a lower resolution elsewhere on the display 1010), or correct distortions (e.g., for images to be provided on the display 1010). In various implementations, the one or more light sources 1022 emit light towards the eye of the user 102 which reflects in the form of a plurality of glints.

In various implementations, the camera 1024 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1024 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, head-mounted device 1000 includes externally facing sensors (e.g., camera 1030 and camera 1035) for capturing information from outside of the head-mounted device 1000. For example, to capture image data of the physical environment that the user 102 is viewing. The image data can include light intensity image data and/or depth data. For example, camera 1030 (e.g., sensor 122 of FIG. 1) may be a video camera for capturing RGB data, and camera 1035 (e.g., sensor 124 of FIG. 1) may be a depth sensor (e.g., a structured light, a time-of-flight, or the like) for capturing depth data.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at an electronic device having a processor:

obtaining spherical image content, wherein the spherical image content is generated using a combination process that combines images that were captured within a particular time period by a multi-camera configuration, the multi-camera configuration comprises a plurality of cameras oriented in different respective orientations, and the time period is below a threshold;

determining an attribute of the spherical image content corresponding to the multi-camera configuration or the combination process, the attribute comprising an identified spatial region of an imperfection within the spherical image content at a first location on the sphere;

generating virtual content based on the determined attribute, wherein at least a portion of the virtual content is configured to be congruent with the imperfection of the spherical image content, and wherein the virtual content comprises a corresponding imperfection that replicates at least one of a type, a magnitude, and a spatial position of the identified imperfection; and generating augmented spherical image content based on the spherical image content and the virtual content.

2. The method of claim 1, wherein the attribute of the spherical image content is determined by determining a hardware-specific characteristic of at least one of the plurality of cameras.

3. The method of claim 2, wherein the hardware-specific characteristic of at least one of the plurality of cameras comprises a camera position of the at least one of the plurality of cameras.

4. The method of claim 2, wherein the hardware-specific characteristic of at least one of the plurality of cameras comprises an orientation of the at least one of the plurality of cameras.

5. The method of claim 2, wherein the hardware-specific characteristic of at least one of the plurality of cameras comprises a lens type of the at least one of the plurality of cameras.

6. The method of claim 1, wherein the attribute of the spherical image content is determined by detecting a disparity in the spherical image content corresponding to the combination process.

7. The method of claim 1, wherein a three-dimensional (3D) view of the augmented spherical image content comprises a virtual object that appears to be at a 3D location within a physical environment depicted by the spherical image content.

8. The method of claim 7, wherein the 3D view comprises an image, video, or 3D reconstruction of a physical environment obtained by the device during a recording.

9. The method of claim 7, wherein the 3D view is presented an extended reality (XR) environment.

10. The method of claim 1, wherein the augmented spherical image content comprises a video.

11. The method of claim 1, wherein the augmented spherical image content comprises stereo images.

12. The method of claim 1, wherein the device is a head-mounted device (HMD).

13. The method of claim 1, wherein the at least the portion of the virtual content is configured to be congruent with the imperfection by being configured to comprise a matching imperfection.

14. The method of claim 1, wherein the imperfection of the spherical image content is associated with at least one of a lens aberration, a light refraction, and a stitching seam.

15. A device comprising:

a non-transitory computer-readable storage medium; and one or more processors coupled to the non-transitory computer-readable storage medium, wherein the non-transitory computer-readable storage medium comprises program instructions that, when executed on the one or more processors, cause the one or more processors to perform operations comprising:

obtaining spherical image content, wherein the spherical image content is generated using a combination process that combines images that were captured within a particular time period by a multi-camera configuration, the multi-camera configuration comprises a plurality of cameras oriented in different respective orientations, and the time period is below a threshold;

determining an attribute of the spherical image content corresponding to the multi-camera configuration or the combination process, the attribute comprising an identified spatial region of an imperfection within the spherical image content at a first location on the sphere;

generating virtual content based on the determined attribute, wherein at least a portion of the virtual content is configured to be congruent with the imperfection of the spherical image content, and wherein the virtual content comprises a corresponding imperfection that replicates at least one of a type, a magnitude, and a spatial position of the identified imperfection; and generating augmented spherical image content based on the spherical image content and the virtual content.

16. The device of claim 15, wherein the attribute of the spherical image content is determined by determining a hardware-specific characteristic of at least one of the plurality of cameras.

17. The device of claim 16, wherein the hardware-specific characteristic of at least one of the plurality of cameras comprises a camera position of the at least one of the plurality of cameras.

18. The device of claim 16, wherein the hardware-specific characteristic of at least one of the plurality of cameras comprises an orientation of the at least one of the plurality of cameras.

19. The device of claim 16, wherein the hardware-specific characteristic of at least one of the plurality of cameras comprises a lens type of the at least one of the plurality of cameras.

20. The device of claim 15, wherein the attribute of the spherical image content is determined by detecting a disparity in the spherical image content corresponding to the combination process.

21. A non-transitory computer-readable storage medium, storing program instructions executable on a device to perform operations comprising:

obtaining spherical image content, wherein the spherical image content is generated using a combination process that combines images that were captured within a particular time period by a multi-camera configuration, the multi-camera configuration comprises a plurality of cameras oriented in different respective orientations, and the time period is below a threshold;

determining an attribute of the spherical image content corresponding to the multi-camera configuration or the combination process, the attribute comprising an identified spatial region of an imperfection within the spherical image content at a first location on the sphere;

generating virtual content based on the determined attribute, wherein at least a portion of the virtual content is configured to be congruent with the imperfection of the spherical image content, and wherein the virtual content comprises a corresponding imperfection that replicates at least one of a type, a magnitude, and a spatial position of the identified imperfection; and generating augmented spherical image content based on the spherical image content and the virtual content.

\* \* \* \* \*